(12) United States Patent
Bates et al.

(10) Patent No.: US 7,995,443 B2
(45) Date of Patent: *Aug. 9, 2011

(54) APPARATUS AND METHOD TO STORE INFORMATION IN A HOLOGRAPHIC DATA STORAGE MEDIUM

(75) Inventors: Allen Keith Bates, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 992 days.

This patent is subject to a terminal disclaimer.

(21) Appl. No.: 11/830,370

(22) Filed: Jul. 30, 2007

(65) Prior Publication Data

US 2009/0034396 A1 Feb. 5, 2009

(51) Int. Cl.
*G03H 1/26* (2006.01)

(52) U.S. Cl. ............... 369/103; 369/112.1; 369/112.15; 359/22; 348/360; 348/369; 348/362

(58) Field of Classification Search .............. 348/360, 348/369, 362; 359/22, 10, 32; 369/103, 369/112.1, 112.15

See application file for complete search history.

(56) References Cited

U.S. PATENT DOCUMENTS

| | | | | |
|---|---|---|---|---|
| 2,910,603 | A | * | 10/1959 | Van Dorsten et al. ........ 313/443 |
| 4,245,882 | A | | 1/1981 | Chang |
| 5,003,339 | A | * | 3/1991 | Kikuchi et al. ............... 396/100 |
| 5,566,151 | A | | 10/1996 | Bates et al. |
| 5,644,413 | A | | 7/1997 | Komma et al. |
| 5,777,760 | A | * | 7/1998 | Hays et al. ........................ 359/7 |
| RE36,393 | E | | 11/1999 | Glaser-Inbari |
| 6,108,135 | A | | 8/2000 | Ho |
| 6,229,771 | B1 | | 5/2001 | Kosoburd et al. |
| 6,310,850 | B1 | * | 10/2001 | Sochava et al. ............... 369/103 |
| 6,388,779 | B1 | | 5/2002 | Curtis et al. |
| 6,828,537 | B2 | | 12/2004 | Jutte |
| 7,142,337 | B2 | | 11/2006 | Berstis |
| 7,142,484 | B2 | | 11/2006 | Ando et al. |
| 2003/0095477 | A1 | * | 5/2003 | Horimai et al. ............ 369/13.28 |

OTHER PUBLICATIONS

Dickson, "Correction of Astigmatish for Off Axis Reconstruction Beam Holographic Deflector", IBM Technical Disclosure Bulletin, Feb. 1981, pp. 4255-4256.
Dickson, "Off-Axis Scanning Holographic Double-Disk", IBM Technical Disclosure Bulletin, Jun. 1989, pp. 182-184.
Kostuk, "Three-Beam Optical Detection for Magneto-Optic Storage Using Holography", IBM Technical Disclosure Bulletin, Aug. 1988, pp. 12-13.

* cited by examiner

*Primary Examiner* — Wayne R Young
*Assistant Examiner* — Dionne H Pendleton
(74) *Attorney, Agent, or Firm* — Dale F. Regelman; Quarles & Brady LLP

(57) ABSTRACT

A method to store information in a holographic data storage medium, wherein the method supplies a holographic data storage medium comprising an encoded focusing hologram and one or more encoded data holograms. The method disposes the holographic data storage medium in a holographic data storage system, and disposes a rotatable imaging lens at an (i)th orientation. The method illuminates the encoded focusing hologram to generate an (i)th reconstructed focusing image, projects that (i)th reconstructed focusing image through the rotatable imaging lens, and onto at optical detector array. The method then calculates an (i)th measured focusing metric, and determines if the (i)th measured focusing metric is greater than or equal to the threshold focusing metric. If the (i)th measured focusing metric is greater than or equal to the threshold focusing metric, then the method decodes the one or more encoded data holograms.

18 Claims, 16 Drawing Sheets

FIG. 10

```
123456789abcdefghijklmnopqrstuvwxyz
zxywvutsrqponmlkjihgfedcba987654321
123456789abcdefghijklmnopqrstuvwxyz
zxywvutsrqponmlkjihgfedcba987654321
123456789abcdefghijklmnopqrstuvwxyz
zxywvutsrqponmlkjihgfedcba987654321
123456789abcdefghijklmnopqrstuvwxyz
zxywvutsrqponmlkjihgfedcba987654321
123456789abcdefghijklmnopqrstuvwxyz
zxywvutsrqponmlkjihgfedcba987654321
123456789abcdefghijklmnopqrstuvwxyz
zxywvutsrqponmlkjihgfedcba987654321
123456789abcdefghijklmnopqrstuvwxyz
zxywvutsrqponmlkjihgfedcba987654321
```

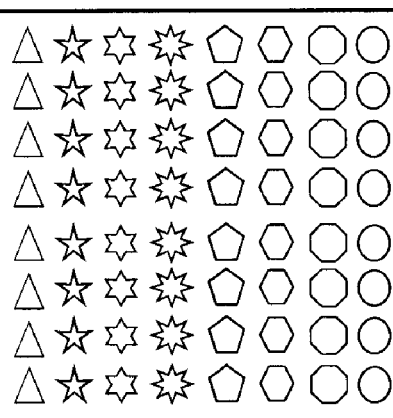

1100

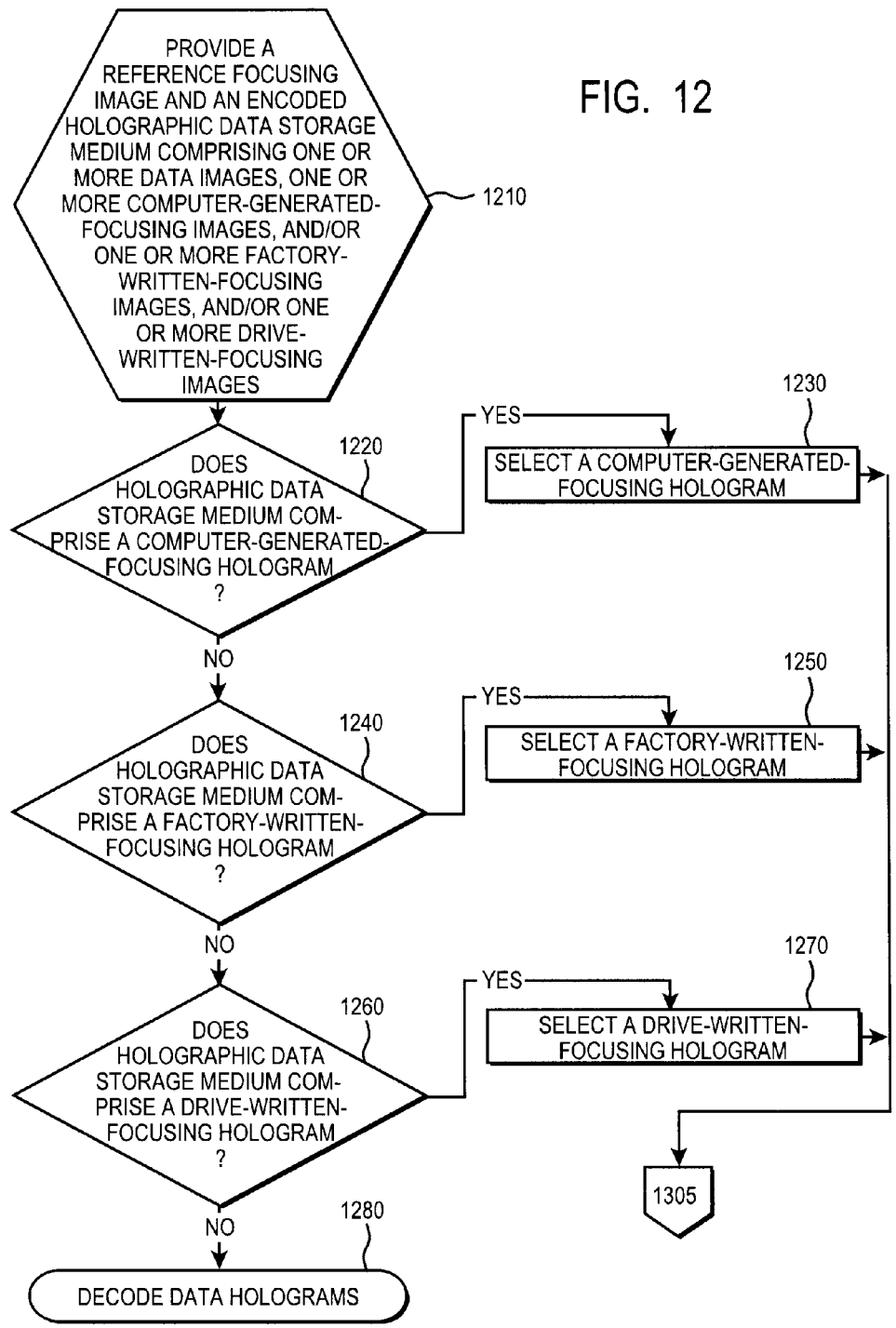

APPARATUS AND METHOD TO STORE INFORMATION IN A HOLOGRAPHIC DATA STORAGE MEDIUM

FIELD OF THE INVENTION

This invention relates to an apparatus and method to store information in a holographic data storage medium.

BACKGROUND OF THE INVENTION

In holographic information storage, an entire page of information is stored at once as an optical interference pattern within a thick, photosensitive optical material. This is done by intersecting two coherent laser beams within the storage material. The first, called the data beam, contains the information to be stored; the second, called the reference beam, is designed to be simple to reproduce, for example a simple collimated beam with a planar wavefront.

The resulting optical interference pattern causes chemical and/or physical changes in the photosensitive medium: a replica of the interference pattern is stored as a change in the absorption, refractive index, or thickness of the photosensitive medium. When the stored interference pattern is illuminated with one of the two waves that were used during recording, some of this incident light is diffracted by the stored interference pattern in such a fashion that the other wave is reconstructed. Illuminating the stored interference pattern with the reference wave reconstructs the data beam, and vice versa.

A large number of these interference patterns can be superimposed in the same thick piece of media and can be accessed independently, as long as they are distinguishable by the direction or the spacing of the patterns. Such separation can be accomplished by changing the angle between the object and reference wave or by changing the laser wavelength. Any particular data page can then be read out independently by illuminating the stored patterns with the reference wave that was used to store that page. Because of the thickness of the hologram, this reference wave is diffracted by the interference patterns in such a fashion that only the desired object beam is significantly reconstructed and imaged on an electronic camera. The theoretical limits for the storage density of this technique are on the order of tens of terabits per cubic centimeter.

SUMMARY OF THE INVENTION

Applicants' invention comprises a method to store information in a holographic data storage medium. The method supplies a holographic data storage medium comprising an encoded focusing hologram and one or more encoded data holograms, and provides a first holographic data storage system comprising a light source, an optical detector array and a rotatable imaging lens.

The method disposes the holographic data storage medium in the holographic data storage system, and disposes the rotatable imaging lens at an (i)th orientation. The method illuminates the encoded focusing hologram with a reference beam to generate an (i)th reconstructed focusing image, projects that (i)th reconstructed focusing image through the rotatable imaging lens, and onto the optical detector array. The method then calculates an (i)th measured focusing metric, and determines if the (i)th measured focusing metric is greater than or equal to the threshold focusing metric. If the method determines that the (i)th measured focusing metric is greater than or equal to the threshold focusing metric, then the method decodes the one or more encoded data holograms.

BRIEF DESCRIPTION OF THE DRAWINGS

The invention will be better understood from a reading of the following detailed description taken in conjunction with the drawings in which like reference designators are used to designate like elements, and in which:

FIG. 10 shows one embodiment of Applicants' focusing image;

FIG. 11 shows a second embodiment of Applicants' focusing image;

FIG. 12 is a flow chart summarizing certain steps of Applicants' method to store information in a holographic data storage medium;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
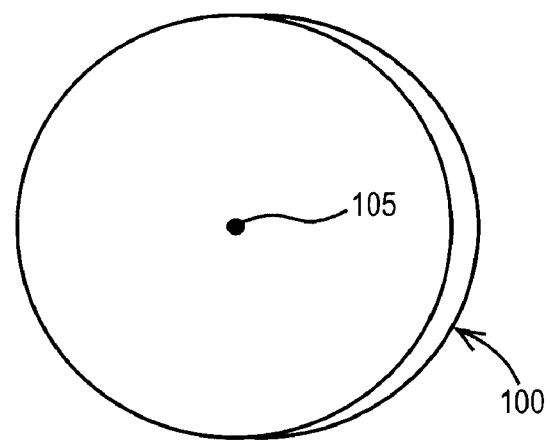
FIG. 1A is perspective view of a holographic data storage medium.
Figure 1B:
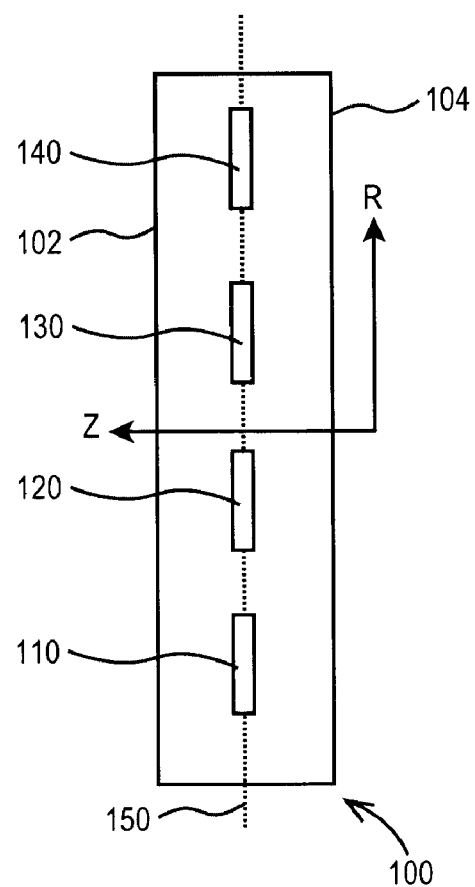
FIG. 1B is a cross-sectional view of the holographic data storage medium of FIG. 1A.
Figure 2A:
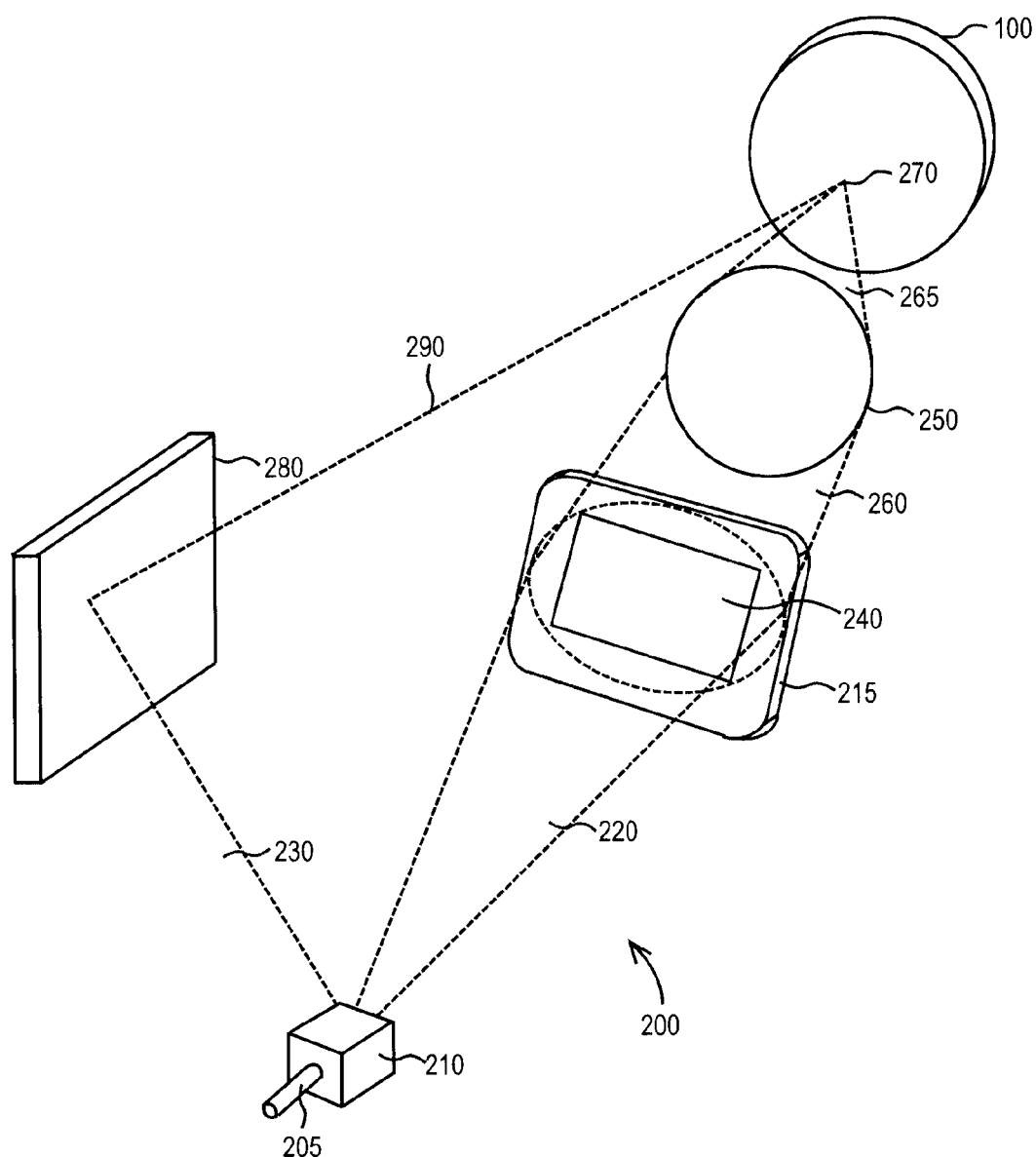
FIG. 2A is a perspective view of a one embodiment of a holographic data storage system shown encoding information into the holographic data storage medium of FIGS. 1A and 1B.
Figure 2B:
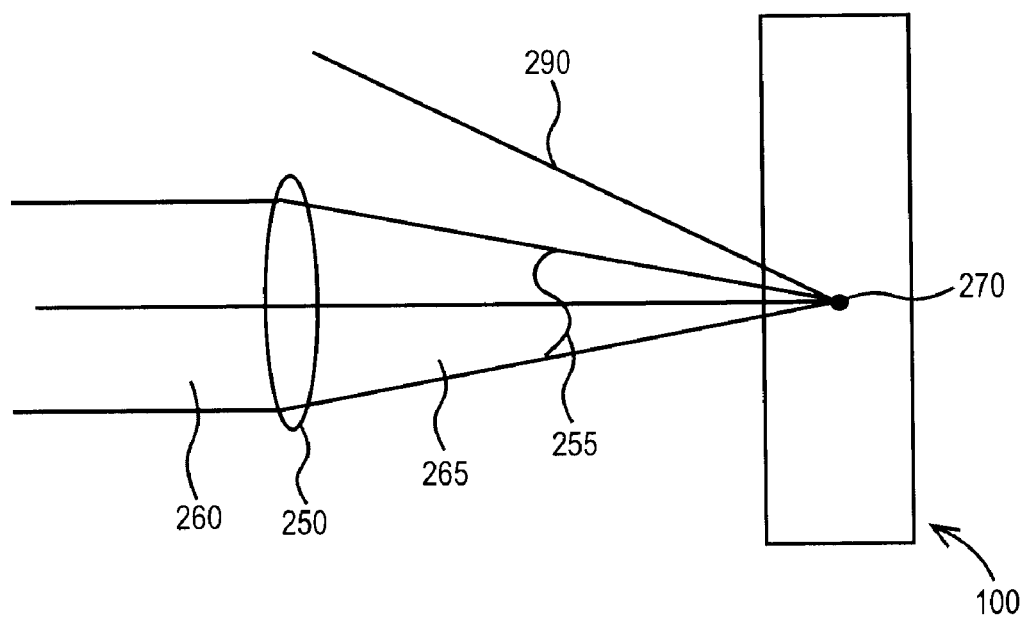
FIG. 2B shows a focusing lens element of the system of FIG. 2A, wherein that focusing lens introduced one or more optical aberrations into the image encoded.

Referring now to FIGS. 2A and 2B, holographic data storage system 200 comprises lasing device 205, a beam splitter 210, transmissive Spatial Light Modulator ("SLM") 215 and mirror 280. In certain embodiments, lasing device 205 emits blue light at a wavelength of about 405 nm. In certain embodiments, lasing device 205 emits or red light at a wavelength of about 650 nm. In certain embodiments, lasing device 205 emits or infrared light at a wavelength of about 780 nm. In certain embodiments, lasing device 205 emits other wavelength(s) of light tuned to the recording and/or reading characteristics of holographic data storage medium 100 (FIGS. 1A, 1B).

In certain embodiments, transmissive SLM 215 comprises an LCD-type device. Information is represented by either a light or a dark pixel on the SLM 215 display. The SLM 215 is typically translucent.

Laser light originating from the lasing device 205 is split by the beam splitter 210 into two beams, a carrier beam 220 and a reference beam 230. The carrier beam 220 picks up the image 240 displayed by the SLM 215 as the light passes through the SLM 215 to form data beam 260. Data beam 260 passes through focusing lens 250 as focused data beam 265. In certain embodiments, focused data beam 265 comprises one or more optical aberrations 255. Reflected reference beam 290 interferes with focused data beam 265 to form a hologram, which is encoded into holographic storage medium 100 as interference pattern 270.

In certain embodiments, image 240 comprises a focusing image. In certain embodiments, image 240 comprises focusing image 1000 (FIG. 10), and interference pattern 270 encodes that focusing image 1000 into holographic data storage medium 100. In certain embodiments, image 240 comprises focusing image 1100 (FIG. 11), and interference pattern 270 encodes that focusing image 1100 into holographic data storage medium 100. In certain embodiments, image 240 comprises a data image, and interference pattern 270 encodes that data image into holographic data storage medium 100.

Figure 3A:
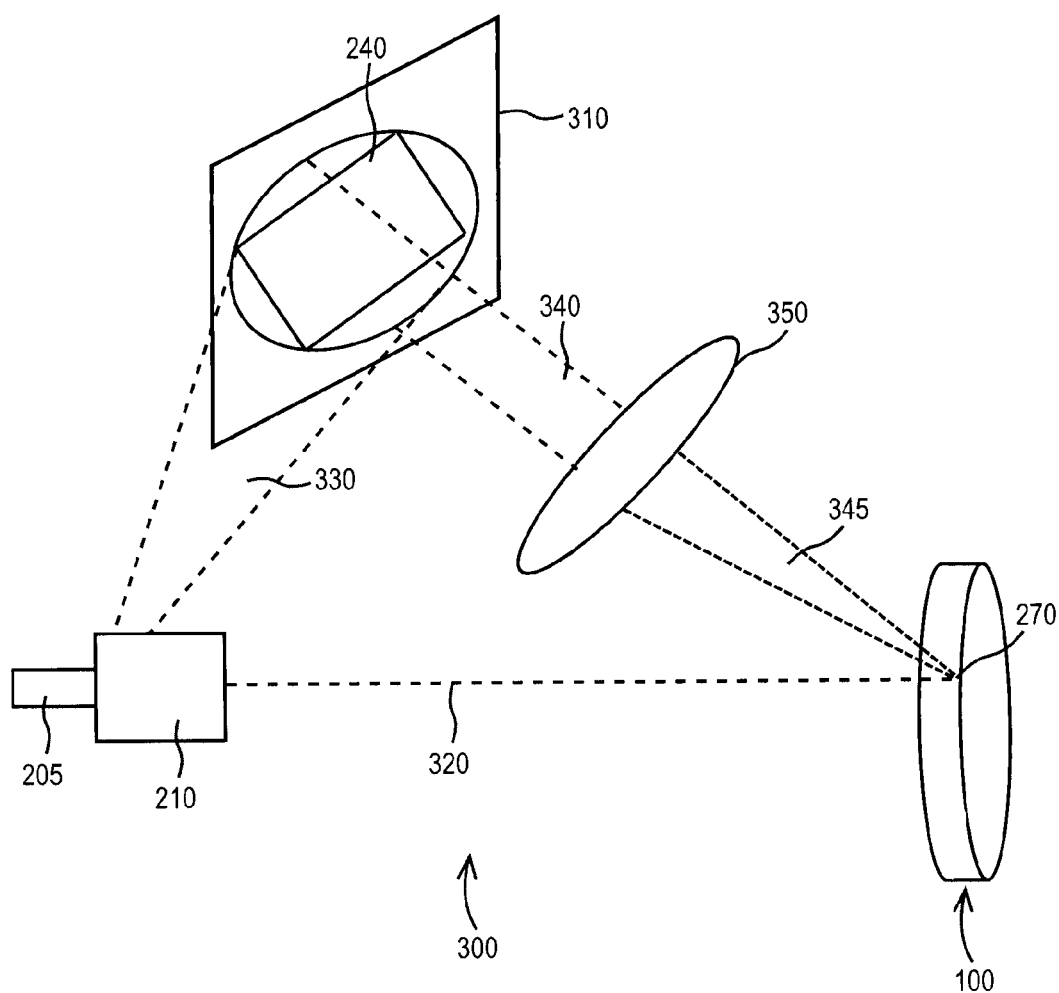
FIG. 3A is a perspective view of a second embodiment of a holographic data storage system shown encoding information into the holographic data storage medium of FIGS. 1A and 1B.
Figure 3B:
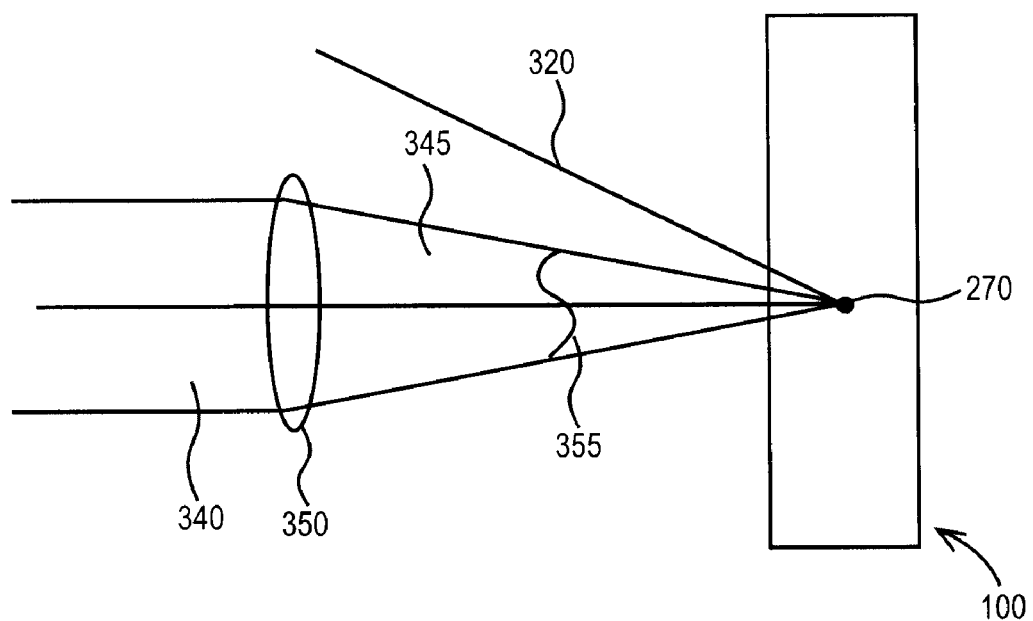
FIG. 3B shows a focusing lens element of the system of FIG. 2A, wherein that focusing lens introduced one or more optical aberrations into the image encoded.
Figure 4:
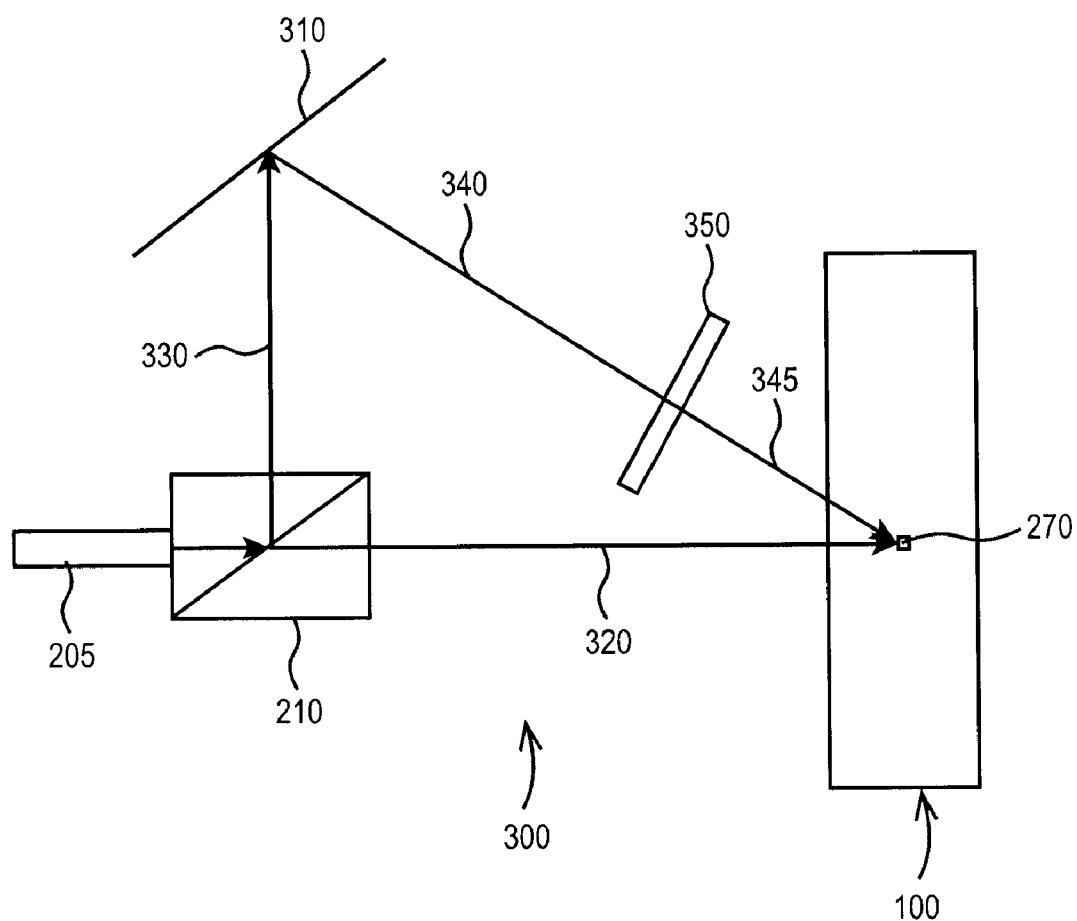
FIG. 4 is a block diagram showing the holographic data storage system of FIG. 3.

Referring now to FIGS. 3A, 3B, and 4, holographic data storage system 300 comprises lasing device 205, beam splitter 210, reflective spatial light modulator 310, focusing lens 350, and holographic storage medium 100. The light generated by lasing device 205 is split by beam splitter 210 into reference beam 320, and carrier beam 330.

In the illustrated embodiment of FIGS. 3A, 3B, and 4, reflective spatial light modulator ("RSLM") 310 displays image 240. In certain embodiments, reflective spatial light modulator 310 comprises an assembly comprising a plurality of micro-mirrors. In other embodiments, reflective spatial light modulator 310 comprises a liquid crystal on silicon ("LCOS") display device. In contrast to nematic twisted liquid crystals used in LCDs, in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

Carrier beam 330 picks up image 240 as the light is reflected off reflective spatial light modulator 310 to form data beam 340 comprising image 240. Data beam 340 passes through focusing lens 350 as focused data beam 345. Unreflected reference beam 320 interferes with focused data beam 345 to form a hologram, which is encoded into holographic data storage medium 100 as interference pattern 270. In certain embodiments, focused data beam 345 comprises one or more optical aberrations 355.

Figure 5:
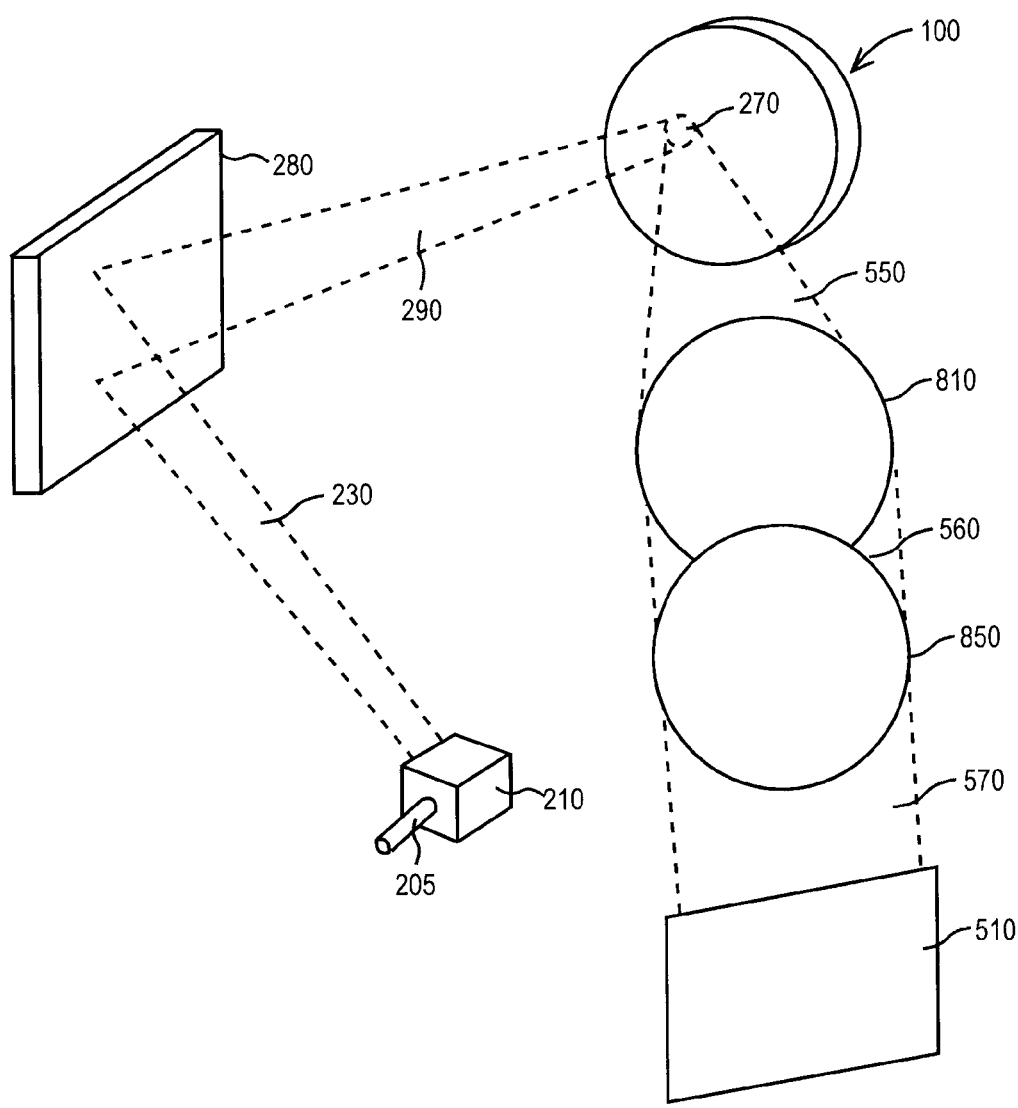
FIG. 5 is a perspective view of a one embodiment of a holographic data storage system shown decoding information encoded into the holographic data storage medium of FIGS. 1A and 1B.

FIG. 5 illustrates holographic data storage system 200 decoding interference pattern 270. In the illustrated embodiment of FIG. 5, holographic data storage system 200 further comprises translatable focusing lens 810, rotatable imaging lens 850, and optical sensor array 510. Optical sensor array 510 is disposed a distance away from holographic storage medium 100 sufficient to digitally detect the focused, astigmatism-reduced, reconstructed data beam 570 projected upon it.

To decode interference pattern 270, reference beam 230 is reflected off mirror 280, to form reflected reference beam 290, which is then incident on the encoded holographic storage medium 100. As the reference beam 290 interferes with interference pattern 270, a reconstructed data beam 550 is generated, wherein that reconstructed data beam 550 comprises an image resembling the original image 240.

Reconstructed data beam 550 passes through translatable focusing lens 810 as focused, reconstructed data beam 560. Focused, reconstructed data beam 560 passes through rotatable imaging lens 850 as focused, astigmatism-reduced, reconstructed data beam 570. That focused, astigmatism-reduced, reconstructed data beam 570 is projected onto optical sensor array 510, which digitally detects the information comprising the projected image.

As those skilled in the art will appreciate, an astigmatism results from a defect in an optical system, wherein light rays from a single point fail to converge in a single focal point. Such an astigmatism may results from an unequal curvature in a lens, such as focusing lens 250 (FIGS. 2A, 2B), and/or focusing lens 350 (FIGS. 3A, 3B, 4), and/or translatable focusing lens 810 (FIGS. 5, 6).

Reconstructed data beam 550, translatable focusing lens 810, rotatable imaging lens 850, and optical sensor array 510, may be disposed on the same side of holographic data storage medium 100 as are lasing device 205 and mirror 280, if holographic data storage medium 100 is reflective. However, translatable focusing lens 810, rotatable imaging lens 850, and optical sensor array 510, may be disposed on the opposite side of holographic data storage medium 100 as are lasing device 205 and mirror 280, if holographic data storage medium 100 is transmissive.

Figure 6:
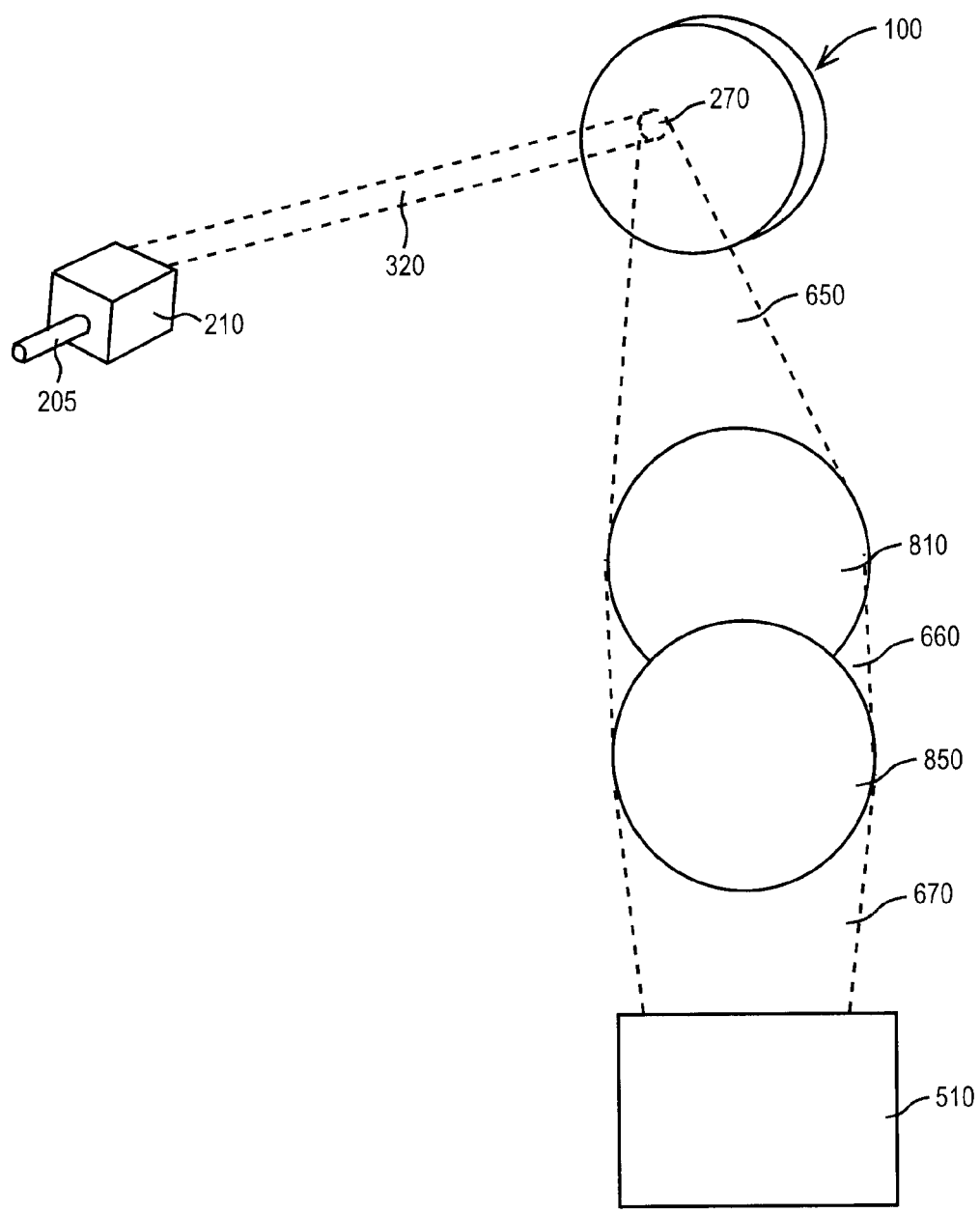
FIG. 6 is a perspective view of a second embodiment of a holographic data storage system shown decoding information encoded into the holographic data storage medium of FIGS. 1A and 1B.

FIG. 6 shows holographic data storage system 300 being used to decode interference pattern 270. In the illustrated embodiment of FIG. 6, reference beam 320 is directed toward holographic storage medium 100 such that reference beam 320 is diffracted by the interference pattern 270 to form reconstructed data beam 650 comprising an image which resembles the original image 240. Reconstructed data beam 650 passes through translatable focusing lens 810 as focused, reconstructed data beam 660. Focused, reconstructed data beam 660 passes through rotatable imaging lens 850 as focused, astigmatism-reduced, reconstructed data beam 670. That focused, astigmatism-reduced, reconstructed data beam 670 is projected onto optical sensor array 510, which digitally detects the information comprising the projected image.

Translatable focusing lens 810, rotatable imaging lens 850, and optical sensor array 510, may be disposed on the same side of holographic data storage medium 100 as are lasing device 205 and mirror 280, if holographic data storage medium 100 is reflective. However, translatable focusing lens 810, rotatable imaging lens 850, and optical sensor array 510, may be disposed on the opposite side of holographic data storage medium 100 as are lasing device 205 and mirror 280, if holographic data storage medium 100 is transmissive.

Figure 7:
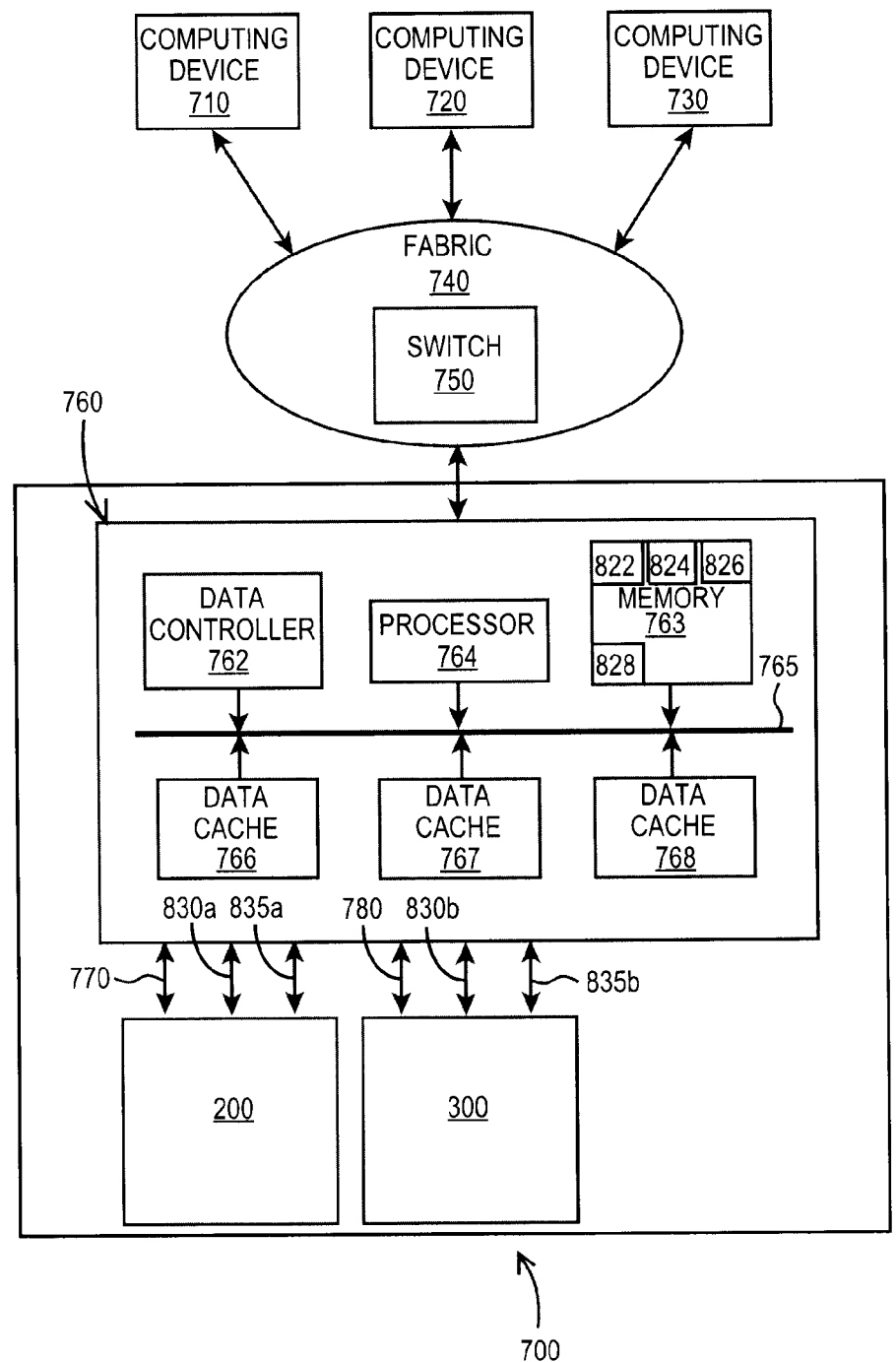
FIG. 7 is a block diagram showing one embodiment of Applicants' holographic data storage system.

FIG. 7 illustrates one embodiment of Applicants' storage controller 760. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic data storage systems. In the illustrated embodiment of FIG. 7, data storage and retrieval system 700 comprises holographic data storage systems 200 and 300.

In certain embodiments, computing devices 710, 720, and 730, are selected from the group consisting of an application server, a web server, a workstation, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, microcode 822, processor 764, and data caches 766, 767, and 768, wherein these components communicate through a data bus 765. In certain embodiments, memory 763 comprises a magnetic information storage medium, an optical information storage medium, an electronic information storage medium, and the like. By "electronic storage media," Applicants mean, for example, a device such as a PROM, EPROM, EEPROM, Flash PROM, COMPACTFLASH, SMARTMEDIA, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

In certain embodiments, storage controller 760 converts a serial data stream into a convolution encoded data images. Those data images are transferred to an SLM 215 or a RSLM 310.

In certain embodiments, the interconnected holographic data storage systems 200, and 300, are located in different geographical places. In certain embodiments, storage controller 760 distributes information between two or more holographic data storage systems in order to protect the information.

Figure 8:
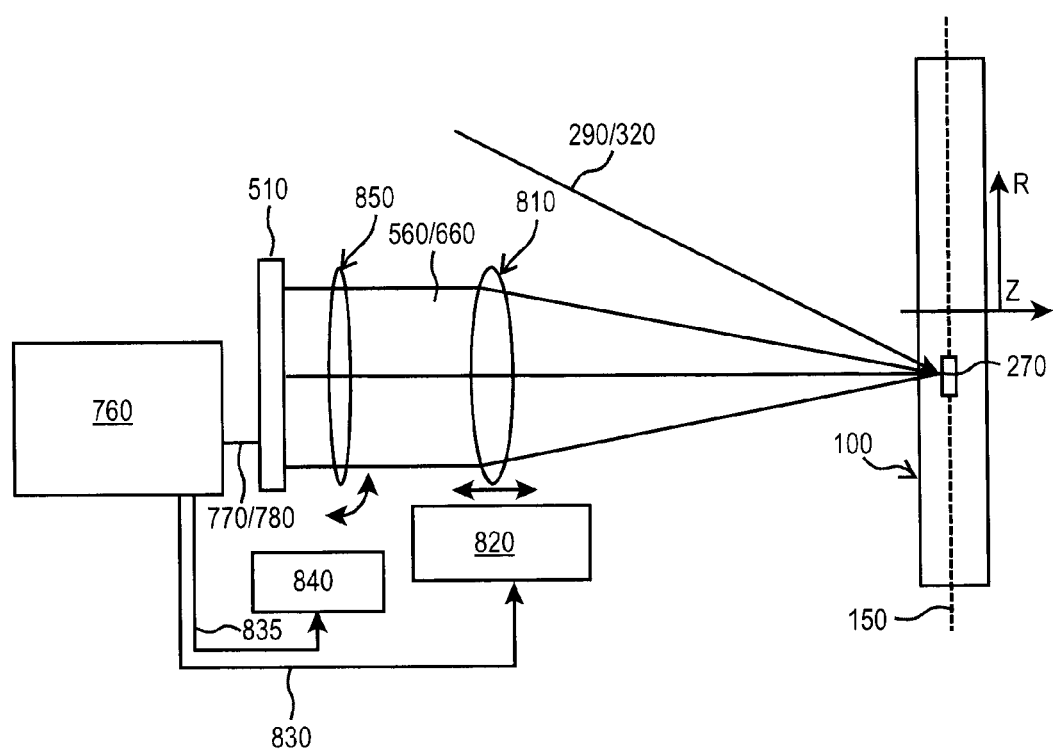
FIG. 8 shows a rotatable imaging lens assembly used to direct a projected image onto an optical detector array.
Figure 9:
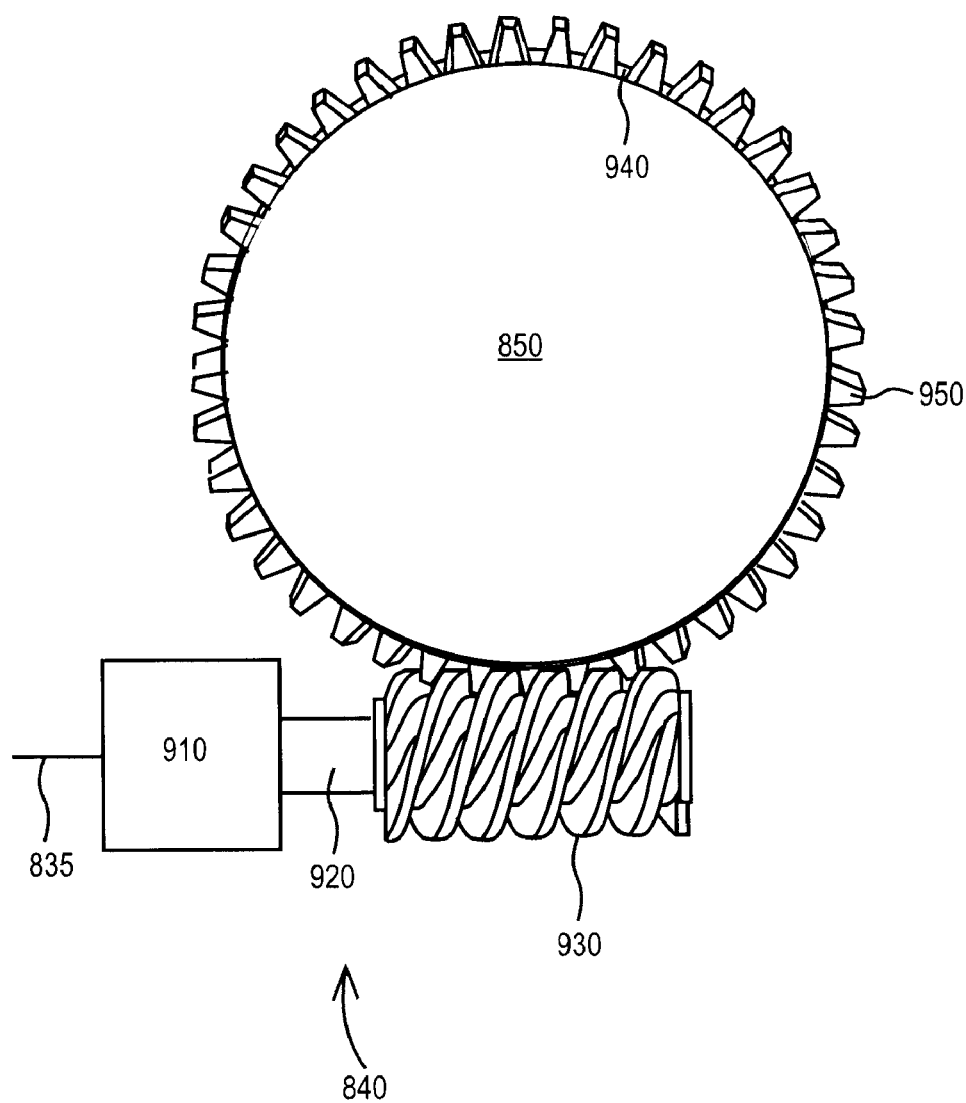
FIG. 9 shows one embodiment of the rotatable imaging lens assembly of FIG. 8.

Referring now to FIGS. 8 and 9, translatable focusing lens 810 is moveably disposed on solenoid assembly 820. Solenoid assembly 820 is in communications with storage controller 760 via communication link 830. Communication link 830 (FIG. 8) is represented in FIG. 7 as 830a for holographic data storage system 200 and as 830b for holographic data storage system 300.

The operation of translatable focusing lens 810 is described in the application having Ser. No. 11/682,206, which is assigned to the common assignee hereof, and which is hereby incorporated herein by reference.

Rotatable imaging lens 850 is rotatably interconnected with servo assembly 840. In the illustrated embodiment of FIG. 8, optical sensor array 510 is in communication with storage controller 760 via communication link 770 and/or 780 of FIGS. 7 and 8, and servo assembly 840 is in communication with storage controller 760 via communication link 835. Communication link 835 (FIG. 8) is represented in FIG. 7 as 835a for holographic data storage system 200 and as 835b for holographic data storage system 300.

In the illustrated embodiment of FIG. 9, servo assembly 840 comprises servo 910 and rotatable shaft 920 extending outwardly therefrom. Rotatable shaft 920 can be positioned to specific angular orientations by sending servo 910 a predefined coded signal. As long as that coded signal exists on input line 835, servo 910 will maintain the associated angular orientation of shaft 920. As the coded signal changes, the angular orientation of the shaft 920 changes.

In the illustrated embodiment of FIG. 9, rotatable shaft 920 comprises spiral-threaded portion 930, and rotatable imaging lens 850 comprises periphery 940 and a plurality of gear teeth 950 disposed along periphery 940. One or more of gear teeth 950 are intermeshed with threaded portion 930 of rotatable shaft 920.

FIGS. 1A and 1B show holographic data storage medium 100 which rotates about center 105 about the Z-axis. In the illustrated embodiment of FIG. 1B, holographic data storage medium 100 comprises factory-written-focusing-hologram 120 (FIG. 1B), drive-written-focusing-hologram 110 (FIG. 1B), computer-generated-focusing hologram 140 (FIG. 1B), and data hologram 130 (FIG. 1B), wherein holograms 110, 120, 130, and 140, are each encoded along data plane 150, which itself is sandwiched between substrate 104 and cover 102.

Factory-written-focusing-hologram 120 (FIG. 1B) and computer-generated-focusing hologram 140 (FIG. 1B) are disposed within the holographic data storage medium by the media manufacturer at the time of manufacture. By "at the time of manufacture," Applicants mean prior to offering the holographic data storage medium for sale, and before encoding any information, such as for example customer data, therein.

In certain embodiments, computer-generated-focusing hologram 140 (FIG. 1B) is stored on a read-only piece of media, which is then physically implanted in the data plane 150 during a separate step of the overall media manufacturing process. In other embodiments, a computer-generated-focusing hologram 140 is stamped or lithographed onto holographic data storage medium 100 on data plane 150, as a separate step of the overall media manufacturing process.

Factory-written-focusing-hologram 120 (FIG. 1B) is encoded directly into holographic data storage medium 100 at the time of manufacture. Factory-written-focusing-hologram 120 (FIG. 1B) and/or the computer generated-hologram 140 (FIG. 1B) are based on ranges of optical tolerances. For the encoding holographic drive apparatus, such optical tolerances include the refractive indices of all focusing lenses, refractive index of spatial light modulator (if a transmissive SLM is used), and refractive index of the beam splitter. For the media, these optical tolerances include the thicknesses and refractive indices of each layer of the holographic data storage medium.

In certain embodiments, Applicants' computer generated focusing hologram is formed using a bit stream suitable for use in a laser writer, such as similar to a DVD-ROM master writer, for producing a stamped or written calibration hologram. In certain embodiments, the master comprises a two-dimensional interference pattern for use in a photolithographic or lithographic-immersion stepper tool to produce a specific pattern. In certain embodiments, the master comprises a three-dimensional interference pattern for use in a holographic imaging writer.

Data hologram 130 (FIG. 1B) is encoded into the holographic data storage medium after purchase by the user. The apparatus used to encode a data hologram 130 may not comprise the same apparatus later used to decode that data hologram 130 (FIG. 1B). Using a first apparatus to encode a data hologram, and a second apparatus to decode that hologram, is called interchange. In certain embodiments, one or more drive-written-focusing-holograms 110 are encoded along with one or more data holograms 130 (FIG. 1B). Those one or more drive-written-focusing-holograms 110 are used to position translatable focusing lens 810 (FIGS. 5, 6, 8), and/or rotatable imaging lens 850 (FIGS. 5, 6, 8, 9) with respect to an encoded holographic data storage medium and/or optical detector array 510 (FIGS. 5, 6, 8) when decoding one or more data holograms 130 (FIG. 1B).

Applicants' invention includes a method to decode one or more data holograms, such as data hologram 130 (FIG. 1B), written to a holographic data storage medium, such as holographic data storage medium 100, wherein that holographic data storage medium comprises an encoded focusing image. References herein to an "encoded focusing image" mean an interference pattern disposed in a holographic data storage medium, wherein that interference pattern encodes a focusing image, such as for example and without limitation focusing image 1000 (FIG. 10) and/or focusing image 1100 (FIG. 11). The designations "encoded focusing image" and "encoded focusing hologram" are used interchangeably herein.

Referring now to FIG. 12, in step 1210 Applicants' method provides a reference focusing image, such as for example reference focusing image 828 which is stored in memory 763 (FIG. 7). In certain embodiments, reference focusing image 828 comprises focusing image 1000 (FIG. 10). In certain embodiments, reference focusing image 828 comprises focusing image 1100 (FIG. 11).

In step 1220, Applicants' method determines if the holographic data storage medium comprises a holographically-encoded, computer-generated-focusing image. In certain embodiments, step 1220 is performed by a storage controller, such as storage controller 760 (FIG. 7). If Applicants' method determines in step 1220 that the holographic data storage medium comprises a holographically-encoded, computer-generated-focusing image, then the method transitions from step 1220 to step 1230 wherein the method selects the a holographically-encoded, computer-generated-focusing image. In certain embodiments, step 1230 is performed by a storage controller, such as storage controller 760 (FIG. 7). Applicants' method then transitions from step 1230 to step 1305 (FIG. 13).

If Applicants' method determines in step 1220 that the holographic data storage medium does not comprises a holographically-encoded, computer-generated-focusing image, then the method transitions from step 1220 to step 1240 wherein the method determines if the holographic data storage medium comprises a holographically-encoded, factory-written-focusing hologram. In certain embodiments, step 1240 is performed by a storage controller, such as storage controller 760 (FIG. 7). If Applicants' method determines in step 1240 that the holographic data storage medium comprises an encoded factory-written-focusing image, then the method transitions from step 1240 to step 1250 wherein the method selects the a holographically-encoded, factory-written-focusing image. In certain embodiments, step 1250 is performed by a storage controller, such as storage controller 760 (FIG. 7). Applicants' method transitions from step 1250 to step 1305 (FIG. 13).

If Applicants' method determines in step 1240 that the holographic data storage medium does not comprises a holographically-encoded, factory-written-focusing image, then the method transitions from step 1240 to step 1260 wherein the method determines if the holographic data storage medium comprises a holographically-encoded, drive-written-focusing hologram. In certain embodiments, step 1260 is performed by a storage controller, such as storage controller 760 (FIG. 7). If Applicants' method determines in step 1260 that the holographic data storage medium comprises a holographically-encoded, drive-written-focusing image, then the method transitions from step 1260 to step 1270 wherein the method selects the a holographically-encoded, factory-written-focusing image. In certain embodiments, step 1270 is performed by a storage controller, such as storage controller 760 (FIG. 7). Applicants' method transitions from step 1270 to step 1305 (FIG. 13). If Applicants' method determines in step 1260 that the holographic data storage medium does not comprises a holographically-encoded, drive-written-focusing image, then the method transitions from step 1260 to step 1280 wherein the method decodes the one or more data holograms.

Figure 13:
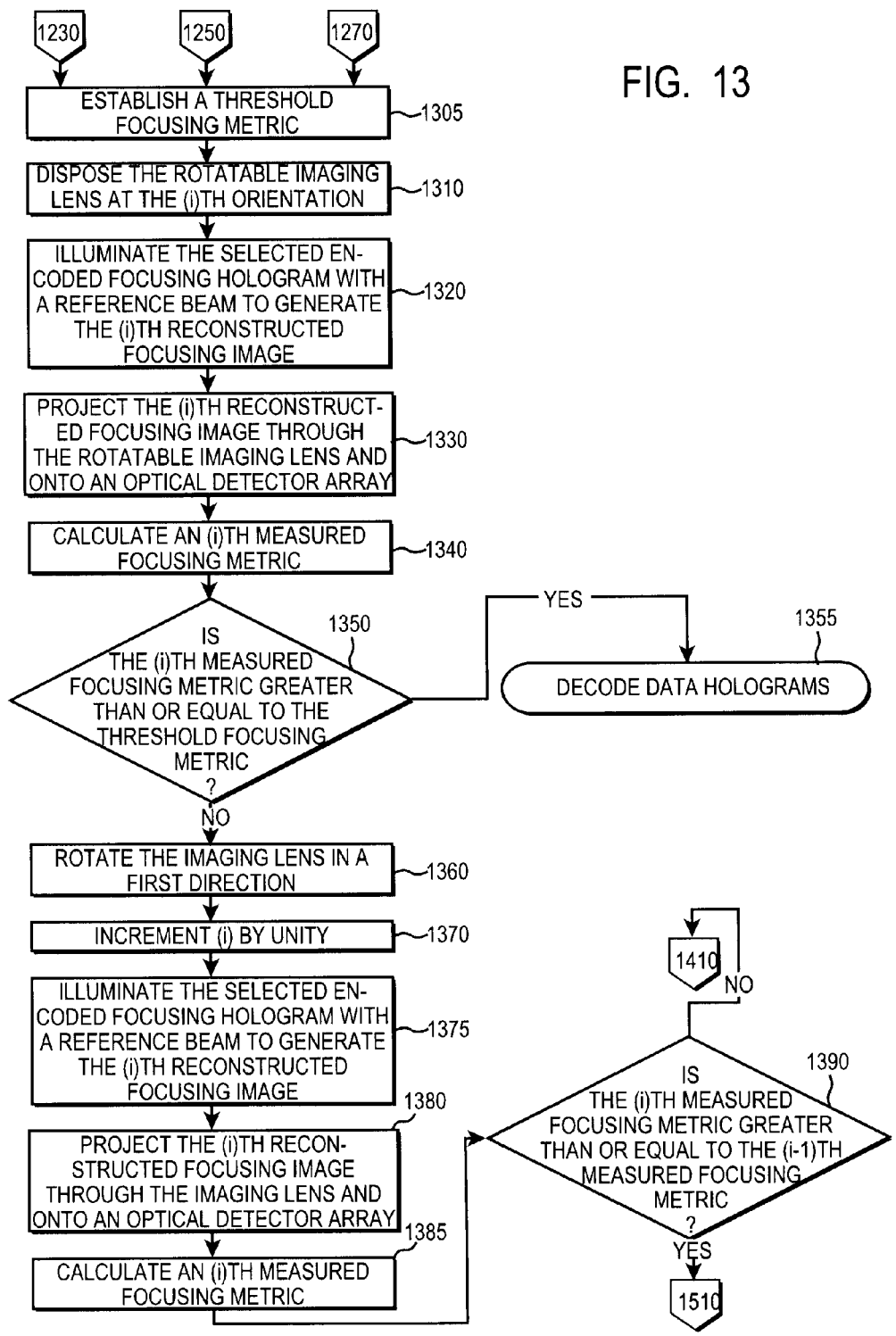
FIG. 13 is a flow chart summarizing the steps of Applicants' method to store information in a holographic data storage medium.

Referring now to FIG. 13, in step 1305 Applicants' method establishes a threshold focusing metric. Step 1305 further comprises retrieving a stored threshold focusing metric, such as stored threshold focusing metric 826 stored in memory 763 (FIG. 7).

In certain embodiments, the threshold focusing metric of step 1310 comprises a threshold bit error rate. In certain embodiments, such a threshold bit error rate comprises the maximum percentage of incorrect bits read.

In other embodiments, threshold focusing metric is calculated using a matched filter correlation $g(x,y)$ between any one of factory-written-focusing-hologram 120 (FIG. 1B), drive-written-focusing-hologram 110 (FIG. 1B), or computer-generated-focusing hologram 140, decoded from the holographic media 100, and the impulse response $h(x,y)=s^*(-x,-y)$ of the reference focusing image 828 (FIG. 7), as shown in Equation [1], where $V(x,y)$ is the cross-correlation between $g(x,y)$ for the factory-written-focusing-hologram 120 (FIG. 1B), drive-written-focusing-hologram 110 (FIG. 1B), or computer-generated-focusing hologram 140, and $s(x,y)$ for the reference focusing image 828 (FIG. 7). Equation [1] comprises a double integral, meaning that the integration is over the X-axis and Y-axis directions of the optical sensor array 510, both of these axes are perpendicular to the Z-axis shown in FIG. 1B. Additionally, $\xi$ is the integration variable along the X axis, η is the integration variable along the Y axis, both of which and * denotes a complex conjugate.

$$V(x,y) = \iint g(\xi,\eta) s^*(\xi-x, \eta-y)] d\xi d\eta \quad [1]$$

Mathematically, V(x,y) is a surface varying along the X-axis and the Y-axis, for each (x,y). There is one value of V(x,y) for each detector element in optical sensor array 510. The range of V(x,y) for each (x,y) is between −1 and +1, where +1 represents the ideal correlation of one hundred (100%). To maximize V(x,y), the following difference surface, Difference(x,y), is defined in Equation. [2]. As shown, Difference(x,y) is calculated by subtracting the matched filter correlation V(x,y) from unity.

$$\text{Difference}(x,y) = 1 - V(x,y) \quad [2]$$

Difference(x,y) may be evaluated (a) point-to-point, (b) as an arithmetic mean, (c) as a geometric mean, and (d) as a root-mean-square. Difference(x,y) ranges between 0 and +2, and the ideal difference for each value of (x,y) is 0, meaning for a value of 0 that there is no difference at that point (x,y) between the factory-written-focusing-hologram 120 (FIG. 1B), drive-written-focusing-hologram 110 (FIG. 1B), or computer-generated-focusing hologram 140, decoded from the holographic media 100, and the reference focusing image 828 (FIG. 7). Difference(x,y) may be evaluated point-by-point in threshold calculations, but it may be advantageous to quantify surface Difference(x,y) in terms of a single number, to simply threshold calculations.

Such single numbers may be MAX_Difference which is equal to the maximum value of Difference(x,y). Alternately AM_Difference, the arithmetic mean of the values of Difference(x,y), GM_Difference, the geometric mean of the values of Difference(x,y), or RMS_Difference, the root-mean-square of the values of Difference(x,y) may be used in the read difference calculations.

In certain embodiments, the threshold focusing metric comprises a maximum percentage of incorrectly read characters. For example and referring to FIG. 10, focusing image 1000 comprises 14 lines of data, wherein each line comprises 36 datapoints. Focusing image 1000 comprises 504 characters. In these embodiments, a 99 percent threshold focusing metric means that 499 of the 504 characters must be correctly read. Referring now to FIG. 11, focusing image 1100 comprises 8 rows, wherein each row comprises 8 objects, for a total of 64 objects. In these embodiments, a 99 percent focusing metric means that 63 of those 64 objects must be correctly read.

Referring FIGS. 8, 9, and 13, in step 1310 Applicants' method positions the rotatable imaging lens, such as rotatable imaging lens 850, at an (i)th orientation, wherein index (i) is initially set to 1. In certain embodiments, step 1310 is performed by a storage controller, such as storage controller 760 (FIG. 7).

In step 1320, Applicants' method illuminates the selected encoded focusing hologram with a reference beam thereby generating the (i)th reconstructed focusing image. In certain embodiments, step 1320 is performed by a storage controller, such as storage controller 760 (FIG. 7).

In step 1330, Applicants' method projects the (i)th reconstructed focusing image through, inter alia, Applicants' rotatable imaging lens and onto an optical detector array. In step 1340, Applicants' method calculates an (i)th measured focusing metric. In certain embodiments, step 1340 is performed by a storage controller, such as storage controller 760 (FIG. 7).

In certain embodiments, step 1340 comprises retrieving a reference focusing image, such as reference focusing image 828 (FIG. 7), and calculating V(x,y) using Equation [1] for each detector array element using the focused, astigmatism-reduced, reconstructed focusing image of step 1330 and that reference focusing image. In certain embodiments, step 1340 comprises calculating a bit error rate using the projected reconstructed focusing image of step 1330 and a reference focusing image. In certain embodiments, step 1340 comprises calculating a character error rate.

In step 1350, Applicants' method determines if the (i)th measured focusing metric of step 1340 is greater than or equal to the threshold focusing metric of step 1305. In certain embodiments, step 1350 is performed by a storage controller, such as storage controller 760 (FIG. 7).

If Applicants' method determines in step 1350 that the (i)th measured focusing metric of step 1340 is greater than or equal to the threshold focusing metric of step 1305, then the method transitions from step 1350 to step 1355 wherein the method decodes the one or more data holograms encoded in the holographic data storage medium.

Alternatively, if Applicants' method determines in step 1350 that the (i)th measured focusing metric of step 1340 is not greater than or equal to the threshold focusing metric of step 1305, then the method transitions from step 1350 to step 1360 wherein the method rotates the rotatable imaging lens in a first direction. In certain embodiments, step 1360 is performed by a storage controller, such as storage controller 760 (FIG. 7).

In step 1370 Applicants' method increments (i) by unity. In certain embodiments, step 1370 is performed by a storage controller, such as storage controller 760 (FIG. 7). In step 1375, Applicants' method illuminates the selected encoded focusing hologram with a reference beam thereby generating the (i)th reconstructed focusing image. In certain embodiments, step 1375 is performed by a storage controller, such as storage controller 760 (FIG. 7).

In step 1380, Applicants' method projects the (i)th reconstructed focusing image through Applicants' rotatably imaging lens and onto an optical detector array. In step 1385, Applicants' method calculates an (i)th measured focusing metric. In certain embodiments, step 1385 is performed by a storage controller, such as storage controller 760 (FIG. 7).

In certain embodiments, step 1385 comprises retrieving a reference focusing image, such as reference focusing image 828 (FIG. 7), and calculating V(x,y) using Equation [1] for each detector array element using the focused, astigmatism-reduced, reconstructed focusing image of step 1375 and that reference focusing image.

In step 1390, Applicants' method determines if the (i)th measured focusing metric of step 1380 is greater than or equal to the (i−1)th measured focusing metric of step 1340. In certain embodiments, step 1390 is performed by a storage controller, such as storage controller 760 (FIG. 7).

Figure 14:
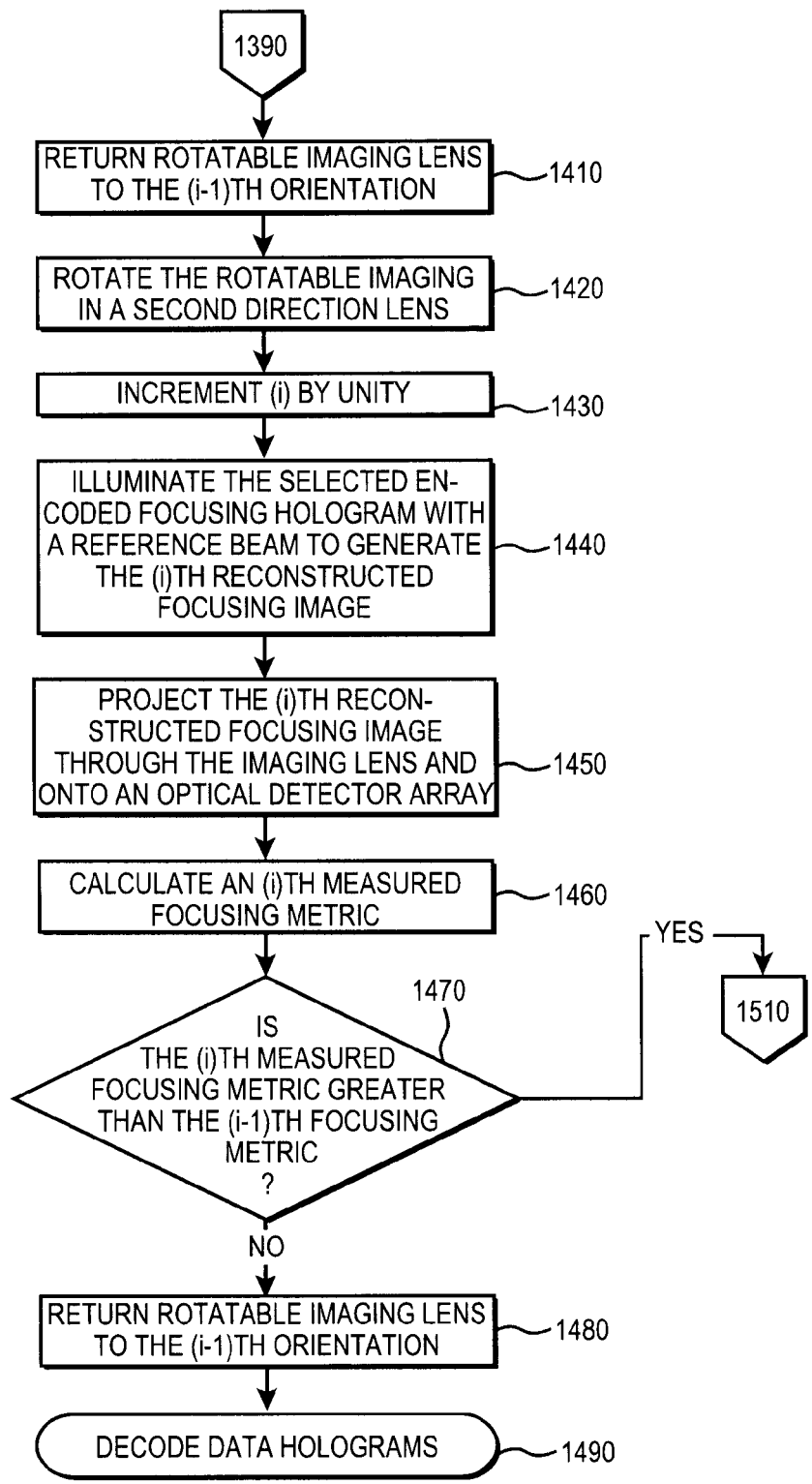
FIG. 14 is a flow chart summarizing certain addition steps of Applicants' method to store information in a holographic data storage medium.
Figure 15:
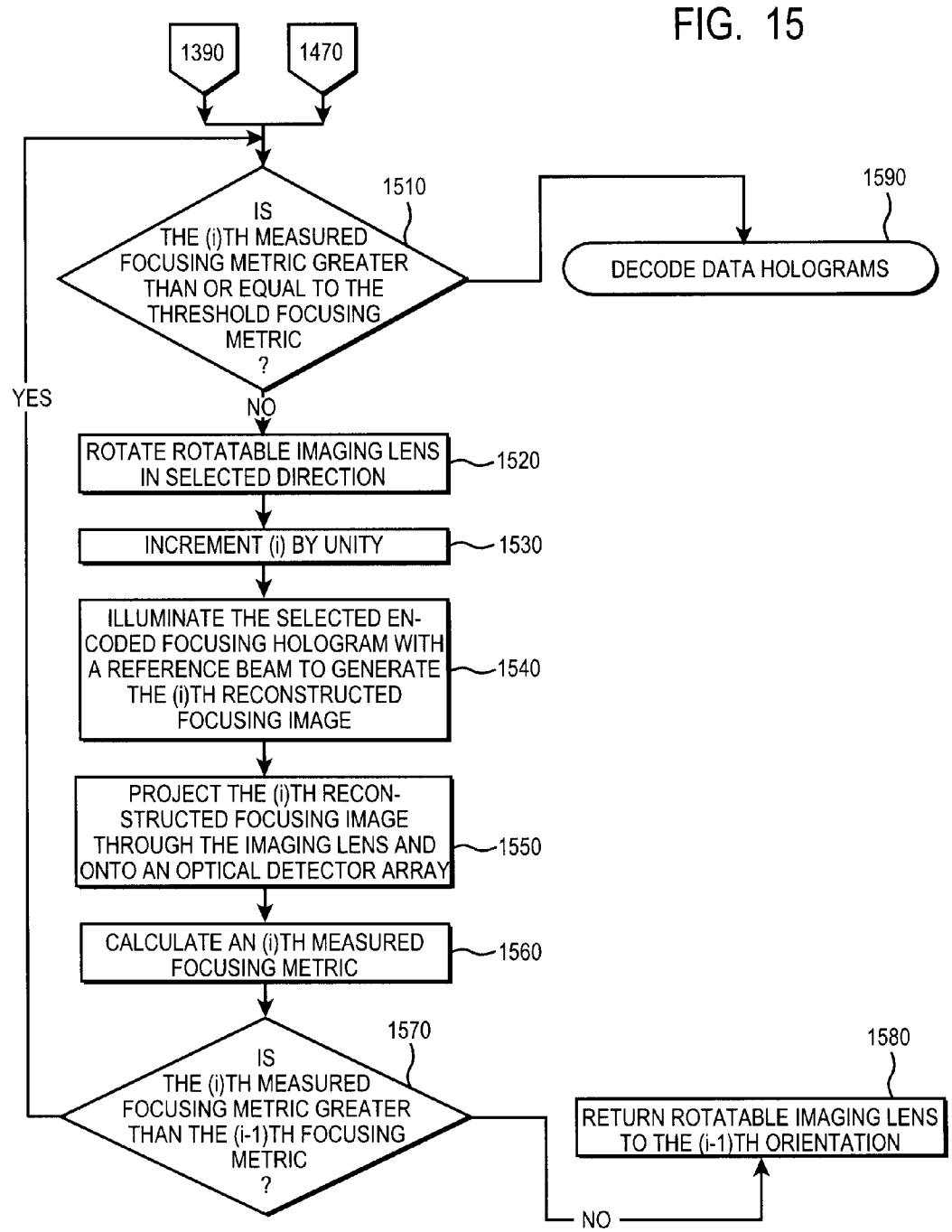
FIG. 15 is a flow chart summarizing certain addition steps of Applicants' method to store information in a holographic data storage medium.

If Applicants' method determines in step 1390 that the (i)th measured focusing metric of step 1380 is greater than or equal to the (i−1)th measured focusing metric of step 1340, then the method transitions from step 1390 to step 1510 (FIG. 15). Alternatively, if Applicants' method determines in step 1390 that the (i)th measured focusing metric of step 1380 is not greater than or equal to the (i−1)th measured focusing metric of step 1340, then the method transitions from step 1390 to step 1410 (FIG. 14).

Referring now to FIG. 14, in step 1410, Applicants' method returns the rotatable imaging lens to the orientation of step 1310 (FIG. 13). In certain embodiments, step 1410 is performed by a storage controller, such as storage controller 760 (FIG. 7).

In step 1420, Applicants' method rotates the imaging lens in a second direction. By "second direction," Applicants mean the direction opposite that the direction of step 1360. For example, if the imaging lens was rotated in a clockwise direction in step 1360, then in step 1420 Applicants' method rotates the imaging lens in the counter clockwise direction. In certain embodiments, step 1420 is performed by a storage controller, such as storage controller 760 (FIG. 7).

In step 1430, Applicants' method increments (i) by unity. In certain embodiments, step 1430 is performed by a storage controller, such as storage controller 760 (FIG. 7). In step 1440, Applicants' method illuminates the selected encoded focusing hologram with a reference beam thereby generating the (i)th reconstructed focusing image. In certain embodiments, step 1440 is performed by a storage controller, such as storage controller 760 (FIG. 7).

In step 1450, Applicants' method projects the (i)th reconstructed focusing image through Applicants' rotatably imaging lens and onto an optical detector array. In step 1460, Applicants' method calculates an (i)th measured focusing metric, as described herein. In certain embodiments, step 1460 is performed by a storage controller, such as storage controller 760 (FIG. 7).

In step 1470, Applicants' method determines if the (i)th measured focusing metric of step 1460 is greater than or equal to the measured focusing metric of step 1385. In certain embodiments, step 1470 is performed by a storage controller, such as storage controller 760 (FIG. 7).

If Applicants' method determines in step 1470 that the (i)th measured focusing metric of step 1460 is not greater than or equal to the measured focusing metric of step 1385, then the method transitions from step 1470 to step 1480 wherein the method returns the imaging lens to the orientation of step 1410, as that orientation gives the best focusing metric. In certain embodiments, step 1480 is performed by a storage controller, such as storage controller 760 (FIG. 7).

In step 1490, Applicants' method decodes the one or more encoded data holograms. In certain embodiments, step 1490 is performed by a storage controller, such as storage controller 760 (FIG. 7). If Applicants' method determines in step 1470 that the (i)th measured focusing metric of step 1460 is greater than or equal to the measured focusing metric of step 1385, then the method transitions from step 1470 to step 1510 (FIG. 15).

Referring now to FIG. 15, in step 1510 Applicants' method determines if the (i)th measured focusing metric of step 1460 is greater than or equal to the threshold focusing metric of step 1305 (FIG. 13). In certain embodiments, step 1510 is performed by a storage controller, such as storage controller 760 (FIG. 7).

If Applicants' method determines in step 1510 that the (i)th measured focusing metric of step 1460 is greater than or equal to the threshold focusing metric of step 1305, then the method transitions from step 1510 to step 1590 wherein the method decodes the one or more data holograms. In certain embodiments, step 1590 is performed by a storage controller, such as storage controller 760 (FIG. 7).

Alternatively, if Applicants' method determines in step 1510 that the (i)th measured focusing metric of step 1460 is not greater than or equal to the threshold focusing metric of step 1305, then the method transitions from step 1510 to step 1520 wherein the method rotates the imaging lens in the selected direction of step 1360 (FIG. 13) if the method transitioned from step 1390 to step 1510, or in the selected direction of step 1420 (FIG. 14) if the method transitioned from step 1470 to step 1510. In certain embodiments, step 1520 is performed by a storage controller, such as storage controller 760 (FIG. 7).

In step 1530, Applicants' method increments (i) by unity. In certain embodiments, step 1530 is performed by a storage controller, such as storage controller 760 (FIG. 7). In step 1540, Applicants' method illuminates the selected encoded focusing hologram with a reference beam thereby generating the (i)th reconstructed focusing image. In certain embodiments, step 1540 is performed by a storage controller, such as storage controller 760 (FIG. 7).

In step 1550, Applicants' method projects the (i)th reconstructed focusing image through Applicants' rotatably imaging lens and onto an optical detector array. In step 1560, Applicants' method calculates an (i)th measured focusing metric, as described herein. In certain embodiments, step 1560 is performed by a storage controller, such as storage controller 760 (FIG. 7).

In step 1570, Applicants' method determines if the (i)th measured focusing metric of step 1560 is greater than or equal to the measured focusing metric of step 1460. In certain embodiments, step 1570 is performed by a storage controller, such as storage controller 760 (FIG. 7).

If Applicants' method determines in step 1570 that the (i)th measured focusing metric of step 1570 is greater than or equal to the measured focusing metric of step 1460, then the method transitions from step 1570 to step 1510 and continues as described herein.

If Applicants' method determines in step 1570 that the (i)th measured focusing metric of step 1570 is not greater than or equal to the measured focusing metric of step 1460, then the method transitions from step 1570 to step 1580 wherein the method returns the rotatable imaging lens to the (i−1)th orientation. In certain embodiments, step 1580 is performed by a storage controller, such as storage controller 760 (FIG. 7). Applicants' method transitions from step 1580 to step 1590 wherein the method decodes the one or more data holograms encoded in the holographic data storage medium.

In certain embodiments, individual steps recited in FIGS. 12, 13, 14, and/or 15, may be combined, eliminated, or reordered.

In certain embodiments, Applicants' invention includes instructions, such as instructions 824 (FIG. 7), residing in memory 763 (FIG. 7), where those instructions are executed by a processor, such as processor 764 (FIG. 7), to perform one or more of steps 1220, 1230, 1240, 1250, 1260, 1270, and/or 1280, recited in FIG. 12, and/or one or more of steps 1305, 1310, 1320, 1330, 1340, 1350, 1355, 1360, 1370, 1375, 1380, 1385, and/or 1390, recited in FIG. 13, and/or one or more to steps 1410, 1420, 1430, 1440, 1450, 1460, 1470, 1480, and/or 1490, recited in FIG. 14, and/or one or more of steps 1510, 1520, 1530, 1540, 1550, 1560, 1570, 1580, and/or 1590, recited in FIG. 15.

In certain embodiments, Applicants' invention includes instructions residing in any other computer program product, where those instructions are executed by a computer external to, or internal to, holographic data storage system 200, holographic data storage system 300, and/or holographic data storage and retrieval system 700, to perform one or more of steps 1220, 1230, 1240, 1250, 1260, 1270, and/or 1280, recited in FIG. 12, and/or one or more of steps 1305, 1310, 1320, 1330, 1340, 1350, 1355, 1360, 1370, 1375, 1380, 1385, and/or 1390, recited in FIG. 13, and/or one or more to steps 1410, 1420, 1430, 1440, 1450, 1460, 1470, 1480, and/or 1490, recited in FIG. 14, and/or one or more of steps 1510, 1520, 1530, 1540, 1550, 1560, 1570, 1580, and/or 1590, recited in FIG. 15.

In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to store information in a holographic data storage medium, comprising the steps of:
    supplying a holographic data storage medium comprising an encoded focusing hologram and one or more encoded data holograms;
    providing a first holographic data storage system comprising a light source, an optical detector array, a rotatable imaging lens, and a servo comprising a rotatable shaft extending outwardly therefrom, wherein said rotatable shaft comprises a spiral-threaded portion, and wherein said rotatable imaging lens comprises a periphery and a plurality of gear teeth disposed along said periphery, wherein one or more of said plurality of gear teeth are intermeshed with said spiral-threaded portion;
    disposing said holographic data storage medium in said holographic data storage system;
    disposing said rotatable imaging lens at an (i)th orientation, wherein (i) is initially set to 1;
    establishing a threshold focusing metric;
    illuminating said encoded focusing hologram with a reference beam to generate an (i)th reconstructed focusing image;
    projecting said (i)th reconstructed focusing image through said rotatable imaging lens, and onto said optical detector array;
    calculating an (i)th measured focusing metric;
    determining if said (i)th measured focusing metric is greater than or equal to said threshold focusing metric;
    operative if said (i)th measured focusing metric is greater than or equal to said threshold focusing metric, decoding said one or more encoded data holograms.

2. The method of claim 1, wherein said supplying step further comprises the steps of:
    providing a computer-generated-hologram comprising a focusing image;
    disposing said computer-generated-hologram into said holographic data storage medium at the time of manufacture.

3. The method of claim 1, wherein said supplying step further comprises the steps of:
    providing a focusing image;
    encoding said focusing image into said holographic data storage medium at the time of manufacture.

4. The method of claim 1, wherein said supplying step further comprises the steps of:
    providing a second holographic data storage system;
    providing a holographic data storage medium;
    disposing said holographic data storage medium in said second holographic data storage system;
    providing a focusing image;
    providing information;
    generating a focusing hologram comprising said focusing image, and one or more data holograms, wherein each of said one or more data holograms comprises an image of all or a portion of said information;
    encoding said focusing hologram and said one or more data holograms into said holographic data storage medium.

5. The method of claim 1, further comprising the steps of:
    determining if said holographic data storage medium comprises a computer-generated-focusing hologram;
    operative if said holographic data storage medium comprises a computer-generated-focusing hologram, selecting said computer-generated-focusing hologram;
    operative if said holographic data storage medium does not comprise a computer-generated-focusing hologram, determining if said holographic data storage medium comprises a factory-written-focusing hologram;
    operative if said holographic data storage medium comprises a factory-written-focusing hologram, selecting said factory-written-focusing hologram;
    operative if said holographic data storage medium does not comprise a factory-written-focusing hologram, determining if said holographic data storage medium comprises a drive-written-focusing hologram;
    operative if said holographic data storage medium comprises a drive-written-focusing hologram, selecting said drive-written-focusing hologram;
    wherein said illuminating step further comprises illuminating said selected focusing hologram.

6. The method of claim 1, further comprising the steps of:
    operative if said (i)th measured focusing metric is not greater than or equal to said threshold focusing metric, incrementing (i) by unity;
    rotating said rotatable imaging lens in a first direction to an (i)th orientation;
    illuminating said encoded focusing image with a reference beam to generate an (i)th reconstructed focusing image;
    projecting said (i)th reconstructed focusing image through said rotatable imaging lens, and onto said optical detector array;
    calculating an (i)th measured focusing metric;
    determining if said (i)th measured focusing metric is greater than or equal to said threshold focusing metric;
    operative if said (i)th measured focusing metric is greater than or equal to said threshold focusing metric, decoding said one or more encoded data holograms.

7. The method of claim 6, further comprising the steps of:
    operative if said (i)th measured focusing metric is not greater than or equal to said threshold focusing metric, determining if said (i)th measured focusing metric is greater than said (i−1)th focusing metric;
    operative if said (i)th measured focusing metric is greater than said (i−1)th focusing metric, repeating the steps of claim 6.

8. The method of claim 7, further comprising the steps of:
    operative if said (i)th measured focusing metric is not greater than said (i−1)th focusing metric, returning said rotatable imaging lens to an (i−1)th orientation;
    incrementing (i) by unity;
    rotating said rotatable imaging lens in a second direction to the (i)th orientation, wherein said second direction is opposite to said first direction;
    illuminating said encoded focusing image with a reference beam to generate an (i)th reconstructed focusing image;
    projecting said (i)th reconstructed focusing image through said rotatable imaging lens, and onto said optical detector array;
    calculating an (i)th measured focusing metric;
    determining if said (i)th measured focusing metric is greater than or equal to said threshold focusing metric;

operative if said (i)th measured focusing metric is greater than or equal to said threshold focusing metric, decoding said one or more encoded data holograms.

9. A storage controller comprising a processor and computer readable program code disposed in a non-transitory computer readable medium, wherein said storage controller is in communication with a holographic data storage system comprising a lasing device, an optical detector array, a rotatable imaging lens, a holographic data storage medium comprising an encoded focusing image and one or more encoded data holograms, said computer readable program code being useable with said processor to store information in said holographic data storage medium, and a servo comprising a rotatable shaft extending outwardly therefrom, wherein said rotatable shaft comprises a spiral-threaded portion, and wherein said rotatable imaging lens comprises a periphery and a plurality of gear teeth disposed along said periphery, wherein one or more of said plurality of gear teeth are intermeshed with said spiral-threaded portion, the computer readable program code comprising a series of computer readable program steps to effect:
 disposing said rotatable imaging lens at an (i)th orientation, wherein (i) is initially set to 1;
 retrieving a threshold focusing metric;
 illuminating said encoded focusing image with a reference beam to generate an (i)th reconstructed focusing image, wherein said (i)th reconstructed focusing image is projected through said rotatable imaging lens and onto said optical detector array;
 calculating an (i)th measured focusing metric;
 determining if said (i)th measured focusing metric is greater than or equal to said threshold focusing metric;
 operative if said (i)th measured focusing metric is greater than or equal to said threshold focusing metric, decoding said one or more encoded data holograms.

10. The storage controller of claim 9, said computer readable program code further comprising a series of computer readable program steps to effect:
 determining if said holographic data storage medium comprises a computer-generated-focusing hologram;
 operative if said holographic data storage medium comprises a computer-generated-focusing hologram, selecting said computer-generated-focusing hologram;
 operative if said holographic data storage medium does not comprise a computer-generated-focusing hologram, determining if said holographic data storage medium comprises a factory-written-focusing hologram;
 operative if said holographic data storage medium comprises a factory-written-focusing hologram, selecting said factory-written-focusing hologram;
 operative if said holographic data storage medium does not comprise a factory-written-focusing hologram, determining if said holographic data storage medium comprises a drive-written-focusing hologram;
 operative if said holographic data storage medium comprises a drive-written-focusing hologram, selecting said drive-written-focusing hologram;
 wherein said illuminating step further comprises illuminating said selected focusing hologram.

11. The storage controller of claim 10, said computer readable program code further comprising a series of computer readable program steps to effect:
 operative if said (i)th measured focusing metric is not greater than or equal to said threshold focusing metric, rotating said rotatable imaging lens in a first direction;
 incrementing (i) by unity;
 illuminating said encoded focusing image with a reference beam to generate an (i)th reconstructed focusing image, wherein said (i)th reconstructed focusing image is projected through said rotatable imaging lens and onto said optical detector array;
 calculating an (i)th measured focusing metric;
 determining if said (i)th measured focusing metric is greater than or equal to said threshold focusing metric;
 operative if said (i)th measured focusing metric is greater than or equal to said threshold focusing metric, decoding said one or more encoded data holograms.

12. The storage controller of claim 11, said computer readable program code further comprising a series of computer readable program steps to effect:
 operative if said (i)th measured focusing metric is not greater than or equal to said threshold focusing metric, determining if said (i)th measured focusing metric is greater than said (i−1)th focusing metric;
 operative if said (i)th measured focusing metric is greater than said (i−1)th focusing metric, rotating said rotatable imaging lens in said first direction;
 incrementing (i) by unity;
 illuminating said encoded focusing image with a reference beam to generate an (i)th reconstructed focusing image, wherein said (i)th reconstructed focusing image is projected through said rotatable imaging lens and onto said optical detector array;
 calculating an (i)th measured focusing metric;
 determining if said (i)th measured focusing metric is greater than or equal to said threshold focusing metric;
 operative if said (i)th measured focusing metric is greater than or equal to said threshold focusing metric, decoding said one or more encoded data holograms.

13. The storage controller of claim 12, further comprising the steps of:
 operative if said (i)th measured focusing metric is not greater than said (i−1)th focusing metric, returning said rotatable imaging lens to the (i−1)th orientation;
 incrementing (i) by unity;
 rotating said rotatable imaging lens in a second direction to the (i)th orientation, wherein said second direction is opposite to said first direction;
 illuminating said encoded focusing image with a reference beam to generate an (i)th reconstructed focusing image, wherein said (i)th reconstructed focusing image is projected through said rotatable imaging lens and onto said optical detector array;
 calculating an (i)th measured focusing metric;
 determining if said (i)th measured focusing metric is greater than or equal to said threshold focusing metric;
 operative if said (i)th measured focusing metric is greater than or equal to said threshold focusing metric, decoding said one or more encoded data holograms.

14. A computer program product encoded in a non-transitory computer readable medium disposed in a holographic data storage system comprising a processor, a lasing device, an optical detector array, a rotatable imaging lens, a holographic data storage medium comprising an encoded focusing image and one or more encoded data holograms, and a servo comprising a rotatable shaft extending outwardly therefrom, wherein said rotatable shaft comprises a spiral-threaded portion, and wherein said rotatable imaging lens comprises a periphery and a plurality of gear teeth disposed along said periphery, wherein one or more of said plurality of gear teeth are intermeshed with said spiral-threaded portion, wherein said computer readable medium is selected from the group consisting of a magnetic information storage medium, an optical information storage medium, and an electronic information storage medium, said computer program product being useable with said processor to encode information in said holographic data storage medium, comprising:

computer readable program code which causes said programmable computer processor to dispose said rotatable imaging lens at an (i)th orientation, wherein (i) is initially set to 1;

computer readable program code which causes said programmable computer processor to retrieve a threshold focusing metric;

computer readable program code which causes said programmable computer processor to illuminate said encoded focusing image with a reference beam to generate an (i)th reconstructed focusing image, wherein said (i)th reconstructed focusing image is projected through said rotatable imaging lens and onto said optical detector array;

computer readable program code which causes said programmable computer processor to calculate an (i)th measured focusing metric;

computer readable program code which causes said programmable computer processor to determine if said (i)th measured focusing metric is greater than or equal to said threshold focusing metric;

computer readable program code which, if said (i)th measured focusing metric is greater than or equal to said threshold focusing metric, causes said programmable computer processor to decode said one or more encoded data holograms.

15. The computer program product of claim 14, further comprising:

computer readable program code which causes said programmable computer processor to determine if said holographic data storage medium comprises a computer-generated-focusing hologram;

computer readable program code, which, if said holographic data storage medium comprises a computer-generated-focusing hologram, causes said programmable computer processor to select said computer-generated-focusing hologram;

computer readable program code which, if said holographic data storage medium does not comprise a computer-generated-focusing hologram, causes said programmable computer processor to determine if said holographic data storage medium comprises a factory-written-focusing hologram;

computer readable program code which, if said holographic data storage medium comprises a factory-written-focusing hologram, causes said programmable computer processor to select said factory-written-focusing hologram;

computer readable program code which, if said holographic data storage medium does not comprise a factory-written-focusing hologram, causes said programmable computer processor to determine if said holographic data storage medium comprises a drive-written-focusing hologram;

computer readable program code which, if said holographic data storage medium comprises a drive-written-focusing hologram, causes said programmable computer processor to select said drive-written-focusing hologram;

wherein said computer readable program code which causes said programmable computer processor to illuminate an encoded focusing image further comprises computer readable program code which causes said programmable computer processor to illuminate said selected focusing hologram.

16. The computer program product of claim 14, further comprising the steps of:

computer readable program code which, if said (i)th measured focusing metric is not greater than or equal to said threshold focusing metric, causes said programmable computer processor to rotate said rotatable imaging lens in a first direction;

computer readable program code which causes said programmable computer processor to increment (i) by unity;

computer readable program code which causes said programmable computer processor to illuminate said encoded focusing image with a reference beam to generate an (i)th reconstructed focusing image, wherein said (i)th reconstructed focusing image is projected through said rotatable imaging lens and onto said optical detector array;

computer readable program code which causes said programmable computer processor to calculate an (i)th measured focusing metric;

computer readable program code which causes said programmable computer processor to determine if said (i)th measured focusing metric is greater than or equal to said threshold focusing metric;

computer readable program code which, if said (i)th measured focusing metric is greater than or equal to said threshold focusing metric, causes said programmable computer processor to decode said one or more encoded data holograms.

17. The computer program product of claim 16, further comprising the steps of:

computer readable program code which, if said (i)th measured focusing metric is not greater than or equal to said threshold focusing metric, causes said programmable computer processor to determine if said (i)th measured focusing metric is greater than said (i−1)th focusing metric;

computer readable program code which, if said (i)th measured focusing metric is greater than said (i−1)th focusing metric, causes said programmable computer processor to rotate said rotatable imaging lens in said first direction;

computer readable program code which causes said programmable computer processor to increment (i) by unity;

computer readable program code which causes said programmable computer processor to illuminate said encoded focusing image with a reference beam to generate an (i)th reconstructed focusing image, wherein said (i)th reconstructed focusing image is projected through said rotatable imaging lens and onto said optical detector array;

computer readable program code which causes said programmable computer processor to calculate an (i)th measured focusing metric;

computer readable program code which causes said programmable computer processor to determine if said (i)th measured focusing metric is greater than or equal to said threshold focusing metric;

computer readable program code which, if said (i)th measured focusing metric is greater than or equal to said threshold focusing metric, causes said programmable computer processor to decode said one or more encoded data holograms.

18. The computer program product of claim 17, further comprising the steps of:
- computer readable program code which, if said (i)th measured focusing metric is not greater than said (i−1)th focusing metric, causes said programmable computer processor to dispose said rotatable imaging lens at the (i−1)th orientation;
- computer readable program code which causes said programmable computer processor to increment (i) by unity;
- computer readable program code which causes said programmable computer processor to rotate said rotatable imaging lens in a second direction to the (i)th orientation, wherein said second direction is opposite to said first direction;
- computer readable program code which causes said programmable computer processor to illuminate said encoded focusing image with a reference beam to generate an (i)th reconstructed focusing image, wherein said (i)th reconstructed focusing image is projected through said rotatable imaging lens and onto said optical detector array;
- computer readable program code which causes said programmable computer processor to calculate an (i)th measured focusing metric;
- computer readable program code which causes said programmable computer processor to determine if said (i)th measured focusing metric is greater than or equal to said threshold focusing metric;
- computer readable program code which, if said (i)th measured focusing metric is greater than or equal to said threshold focusing metric, causes said programmable computer processor to decode said one or more encoded data holograms.

* * * * *